Figure 1:
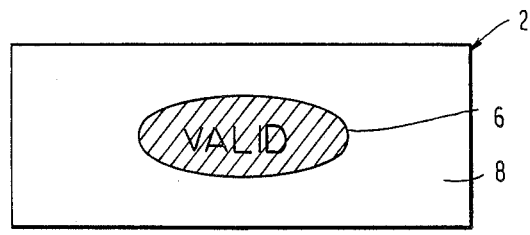

United States Patent [19]

Trundle et al.

[11] Patent Number: 4,927,180
[45] Date of Patent: May 22, 1990

[54] MARKING OF ARTICLES WITH PHOTOCHROMIC COMPOUNDS

[75] Inventors: Clive Trundle, Silverstone; Jack Brettle, Greens Norton, both of England

[73] Assignee: Plessey Overseas Limited, England

[21] Appl. No.: 187,690

[22] PCT Filed: Aug. 21, 1987

[86] PCT No.: PCT/GB87/00592
§ 371 Date: Jun. 6, 1988
§ 102(e) Date: Jun. 6, 1988

[87] PCT Pub. No.: WO88/01288
PCT Pub. Date: Feb. 25, 1988

[30] Foreign Application Priority Data

Aug. 22, 1986 [GB] United Kingdom ................ 8620430

[51] Int. Cl.$^5$ ................................................ B42D 15/00
[52] U.S. Cl. ........................................ 283/70; 283/92; 283/94; 283/901; 283/904
[58] Field of Search ................ 283/70, 92, 94, 904, 283/901, 902

[56] References Cited

U.S. PATENT DOCUMENTS

| | | | |
|---|---|---|---|
| 3,594,933 | 7/1971 | Cooper | 40/2.2 |
| 3,628,271 | 12/1971 | Carrell et al. | 40/311 |
| 3,640,009 | 2/1972 | Komlyama | 40/2.2 |
| 3,755,935 | 9/1973 | Annenberg | 283/94 |
| 4,444,939 | 4/1984 | Postle et al. | |
| 4,500,116 | 2/1985 | Ferro et al. | 283/92 |

FOREIGN PATENT DOCUMENTS

| | | |
|---|---|---|
| 0057279 | 12/1981 | European Pat. Off. |
| 985089 | 3/1965 | United Kingdom . |
| 1221103 | 2/1971 | United Kingdom . |
| 1227713 | 4/1971 | United Kingdom . |
| 1227784 | 4/1971 | United Kingdom . |
| 1332185 | 10/1973 | United Kingdom . |
| 1347804 | 2/1974 | United Kingdom . |
| 1464603 | 2/1977 | United Kingdom . |
| 1568510 | 5/1980 | United Kingdom . |
| 2131767 | 6/1984 | United Kingdom . |
| 2141665 | 1/1985 | United Kingdom . |
| 2174313 | 11/1986 | United Kingdom . |

OTHER PUBLICATIONS

PCT Application No. WO 83/00568, published Feb. 17, 1983.
Japanese Patent Abstract No. 60-79992, vol. 9, No. 223, Sep. 10, 1985.

Primary Examiner—Paul A. Bell
Attorney, Agent, or Firm—Sughrue, Mion, Zinn, Macpeak & Seas

[57] ABSTRACT

A method of marking an article or substrate with a mark or device which is made visible or is enhanced on exposure to U.V. light which comprises printing onto the article or substrate a photochromic ink containing a photochromic compound which is reversibly converted to a colored form on exposure to U.V. light and reverts to a substantially colorless form in the absence of U.V. light and applying a superficial protective layer to said mark or device which protects the phototochromic compound against degradation by atmospheric moisture and oxygen. In addition the invention includes a security device in the form of a label, document or card which incorporates a mark or device which is partially or wholly invisible in light which does not contain a U.V. component, which comprises a substrate having printed thereon using a photochromic ink a mark or device and having a clear, superficial protective layer over said mark or device gives protection for the photochromic compound against degradation by atmospheric moisture and oxygen, said photochromic compound being converted to a colored form on exposure to U.V. light and reverting to a pale or substantially colorless form in the absence of U.V. light.

11 Claims, 1 Drawing Sheet

MARKING OF ARTICLES WITH PHOTOCHROMIC COMPOUNDS

The present invention relates to the application of photochromic markings to articles and in particular to labelling of articles and substrates with photochromic marks for security or validation purposes.

It is desirable in many commercial fields to provide validation or security markings to products or documents in order to make forgery or counterfeiting more difficult. Examples are records or tapes, spare parts for vehicles or equipment, cheques, bank books, credit cards and other security devices.

A variety of methods have been proposed for making security devices, such as identity cards, more difficult to tamper with. U.S. Pat. No. 3,755,935, describes the production of an identity card which incorporates a double-sided photograph laminated into a composite card and having overlaying security printing. The inks disclosed include fluorescent inks. Cards such as described in this U.S. patent are very expensive to produce and such costs would not be acceptable for the production of validation labels and security documents such as cheque books or credit cards. Furthermore, inks which merely fluoresce in ultra-violet light can be easily formulated using standard optical brightners and do not present significant problems to forgers.

According to the present invention there is provided a method of marking an article or substrate with a mark or device which is made visible or is enhanced on exposure to U.V. light which comprises printing onto the article or substrate a photochromic ink containing a photochromic compound which is reversibly converted to a coloured form on exposure to U.V. light and reverts to a substantially colourless form in the absence of U.V. light and applying a superficial protective layer to said mark or device which protects the photochromic compound against degradation by atmospheric moisture and oxygen.

The invention also includes a security device in the form of a label, document or card which incorporates a mark or device which is partially or wholly invisible in light which does not contain a U.V. component, which comprises a substrate having printed thereon using a photochromic ink a mark or device and having a clear, superficial protective layer over said mark or device which gives protection for the photochromic compound against degradation by atmospheric moisture and oxygen, said photochromic compound being converted to a coloured form on exposure to U.V. light and reverting to a pale or substantially colourless form in the absence of U.V. light.

The selection of photochromic compounds which reversibly colour in U.V. light and bleach in artificial light or filtered sunlight makes it difficult for a validation or security mark to be reproduced by a counterfeiter. A mark can be made even more difficult to reproduce illegitimately by employing a mixture of photochromic compounds having different absorption spectra or by printing a device using one or more inks containing different photochromic compounds.

Suitable photochromic compounds for use in the present invention should be capable of colouring rapidly in U.V. light at a wavelength of about 350 to 400 nm and reverting to a colourless form in the absence of such radiation. A rate of colouring of up to about 60 seconds and a fade rate of not more than 2 to 3 minutes is desirable. For some applications, e.g. for credit cards, the photochromic compounds should be capable of undergoing a multiplicity of reversible colouring-fade conversions, e.g. several hundred and be sufficiently stable to operate for the normal life of the credit card, e.g. about two years. Other applications such as validation labels for products such as records, tapes and spare parts may be less demanding.

Photochromic compounds which are particularly suited for use in the present invention include fulgides and fulgimides of the kind described in U.K. Patent Specifications Nos. 1,464,603, 2,002,752 and in U.K. Patent Specification 2,146,327 and photochromic spiropyran compounds as described in U.K. Patent Publication Nos. 2,190,379 and 2,193,005.

The compounds described in the above patents and applications are capable of undergoing a large number of reversible colour changes on exposure to U.V. light or light having a U.V. component. The colour change may be to yellow, red or blue or to an intermediate colour. Other colours may be produced by mixing one or more compounds. Some of the above compounds are sensitive to U.V. light or light having a very large U.V. component but will remain colourless in white light which contains a U.V. component, e.g. in sunlight. In general, the compounds described in the first two above-mentioned patent specifications will colour in light which is predominantly U.V., while the compounds described in the last three specifications will additionally colour in sunlight. In all cases, bleaching generally occurs in white light having no U.V. component or when the compounds are heated.

The photochromic fulgides or fulgimides which are preferably employed in the present invention are succinic anhydride or succinimide derivatives which may be represented by the general formulae (I), (IA) and (IB):

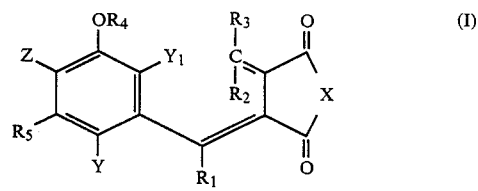
(I)

wherein

X represents oxygen or $>NR_6$, $R_6$ being hydrogen, alkyl, aryl or aralkyl, $R_1$ represents hydrogen, alkyl, aryl or aralkyl, Y and $Y^1$ are the same or different and represent hydrogen, alkyl, halogen or alkoxy, Z represents hydrogen, halogen, alkyl, alkoxy or aryloxy, $R_5$ represents hydrogen, alkyl, alkoxy or aryloxy, $R_4$ represents alkyl, aryl or aralkyl and $R_2$ and $R_3$ represents the same or different alkyl or aryl groups or one of $R_2$ and $R_3$ represents hydrogen and the other is alkyl, aryl or aralkyl with the proviso that when Z or Y is alkoxy or aryloxy, R is other than hydrogen.

Compounds of general formula (I) and their preparation are described in U.K. Patent Specification No. 1,442,628.

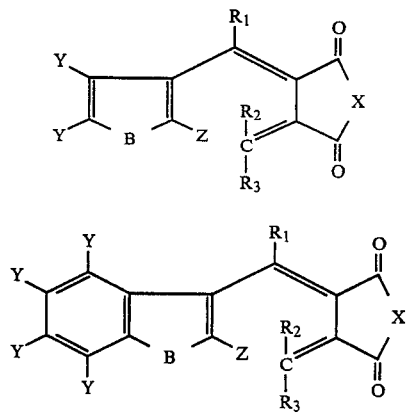

(IA)

(IB)

in which X represents oxygen or NR$_6$ where R$_6$ represents hydrogen, alkyl having 1 to 20 carbon atoms, cycloalkyl having 5 to 12 carbon atoms, aralkyl having 7 to 9 carbon atoms, aryl having 6 to 14 carbon atoms, which may be substituted with one or more halogen or alkoxy groups having 1 to 20 carbon atoms, or alkaryl having 7 to 22 carbon atoms; B represents oxygen or sulphur; R$^1$ represents a hydrogen atom, an alkyl group having 1 to 20 carbon atoms or an aryl group having 6 to 14 carbon atoms; R$^2$ and R$^3$ are the same or different alkyl groups having 1 to 20 carbon atoms or one of R$^2$ and R$^3$ is hydrogen and the other is an alkyl group having 1 to 20 carbon atoms, or an aryl group having 6 to 14 carbon atoms which may be substituted with one or more halogen atoms and/or any combination of groups selected from the following alkoxy groups having 1 to 20 carbon atoms, or alkaryl having 7 to 22 carbon atoms; or is a methylenedioxy group, Z represents hydrogen, an alkyl group having 1 to 20 carbon atoms, an aryl group having 6 to 14 carbon atoms or an aralkyl group having 7 to 20 carbon atoms; each Y is the same or different and represents a hydrogen or halogen atom, an alkyl or alkoxy group having 1 to 20 carbon atoms, or an aryl or aryloxy group having 6 to 14 carbon atoms.

Compounds of general formula (IA) & (IB) and their preparation are described in U.K. Patent Specification No. 1,464,603.

The colour change of the above compounds is generally from colourless to red or blue on irradiation at 366 nm. Reversal takes place in white light.

Fulgides of general formula (IA) & (IB) are preferred in this class of compounds because they are less prone to the formation of fatigue products.

It is also possible to use certain gamma lactone analogues of the compounds of general formula (IA) & (IB). Such photochromic lactones are described in U.K. Patent Publication No. 2,191,195 and have the following general formula:

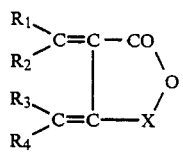

(IC)

in which X represents

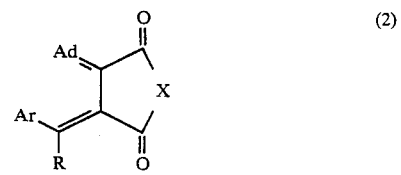

R$_1$, R$_2$ and R$_4$ independently represent a group selected from hydrogen, alkyl, aralkyl or aryl (including substituted aryl), with the proviso that one of R$_1$ and R$_2$ is always hydrogen, and R$_3$ is a 3-thienyl, 3-furyl, 3-benzothienyl or 3-benzofuryl group in which the 2-position is substituted with an alkyl, aralkyl or aryl group (including substituted aryl). The 5-position of the thienyl or furyl ring may also be substituted, e.g. with an alkyl, aryl or aralkyl group.

Compounds of general formula (IA) and (IB) are generally highly soluble in solvents commonly used in screen printing, such as aromatic hydrocarbons and alkoxy alkanols (e.g. 2-ethoxy ethanol) and also in certain polymers such as polymethyl methacrylate (pmma).

A second group of photochromic fulgides which are effective for the purposes of the present invention are photochromic adamantylidene - succinic anhydride and succinimide compounds as described in U.K. Patent Specification No. 2,002,752. These compounds may be represented by the general formula (2):

(2)

wherein
X represents oxygen or >NR$_6$, R$_6$ being hydrogen or an alkyl, aryl or aralkyl group;
R represents hydrogen or an alkyl, aryl, aralkyl or heterocyclic group;
Ar represents a 3-furyl, 3-thienyl group, 3-benzofuryl or 3-benzothienyl group, or a phenyl group containing a meta-alkoxy or aryloxy substituent, and
Ad represents an adamantylide group.

Compounds exhibit excellent stability against degradation but are not as soluble in solvents and polymers as the compounds mentioned above.

We may also employ photochromic fulgide compounds as described in U.K. Patent Specification No. 2,146,327. These compounds colour in sunlight and revert to the colourless form in white light. They may be represented by the general formula (3):

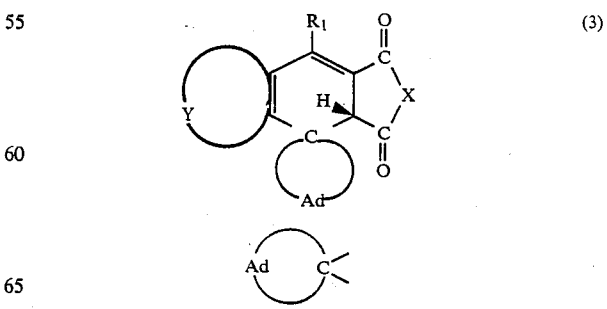

(3)

represents an adamantylidene or a substituted adamantylidene group;

$R_1$ represents hydrogen, alkyl, aryl, aralkyl or a heterocyclic group;

X represents oxygen or >NR$_2$, in which $R_2$ is hydrogen, aryl, alkyl or aralkyl and

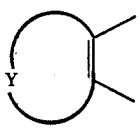 (II)

represents an aromatic group, an unsaturated heterocyclic group or a benzannelated heterocyclic group.

Certain photochromic spiropyran compounds may also be used in the method and products of the present invention.

These spiropyran compounds may be represented in general terms by the following formulae (4), (4A) and (4B), in which formula (4) represents the 2H-benzopyran series and formulae (4A) and (4B) represent the isomeric naphthopyran series.

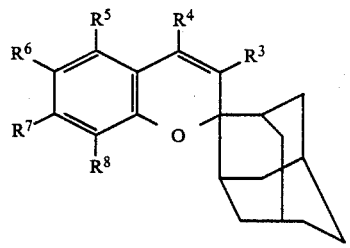 (4)

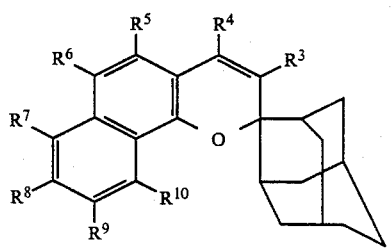 (4A)

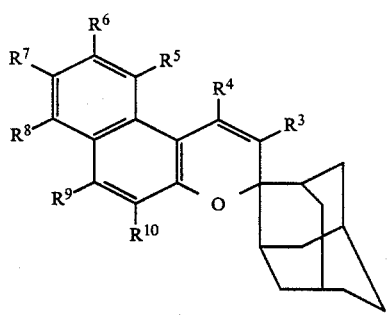 (4B)

A wide variety of substituents are possible in the benzopyran or napthopyran rings. For example, the rings can be substituted in the positions represented by $R_3$ to $R_8$ (or $R_3$ to $R_{10}$) with alkyl, aryl (including substituted phenyl, e.g. alkoxyphenyl and halophenyl), alkoxy, hydroxy, alkyl or dialkylamino (e.g. dimethylamino), alkylamino-phenyl, halogen or heterocyclic groups, with the proviso that hydroxy or alkoxy or alkyl- or dialkylamino may not be a substituent in the $R_3$ or $R_4$ position. Preferred substituents are lower alkyl (e.g. methyl or ethyl), chlorine, bromine, hydroxy, phenyl, methoxy, or methoxy phenol groups. It is also possible to produce related series of compounds in which the basic benzopyran or naphthopyran nuclei are annelated with aryl or heterocyclic rings, such as a thiopene or furan ring. Such compounds will be described in more detail subsequently herein.

Compounds of general formula (4), (4A) & (4B) above colour to yellow in sunlight or U.V. light. This is an unusual colour change for a photochromic compound and provides good potential as a highly secure photochromic marking ink.

The above compounds and their preparation are described in U.K. Patent Application No. 87 11511.

Also useful for the production of devices in accordance with this invention are photochromic benzo- and naphthopyrans of the general formula (5):

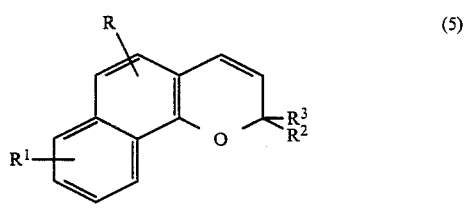 (5)

Where R and $R^1$ may be independently selected from hydrogen, alkyl, alkoxy, chloro, alkyl or dialkyl amino or hydroxy, and $R^2$ and $R^3$ are preferably alkyl or aryl but may together represent a spiro heterocyclic ring. Photochromic pyrans and methods for their preparation are disclosed in our copending Patent Application No. 87 13930.

In common with the compounds of general formulae 4, 4A & 4B, the compounds of formula 5 are heliochromic, although they tend to colour to red or blue in U.V. light.

A general method of preparation of the compounds of formulae 4, 4A, 4B & 5 involves a modification of the Claisen rearrangement reaction. The reaction can be expressed in general terms as follows:

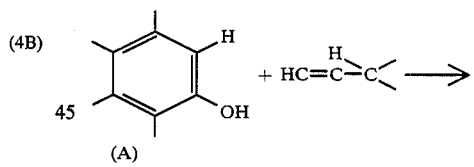
(A)

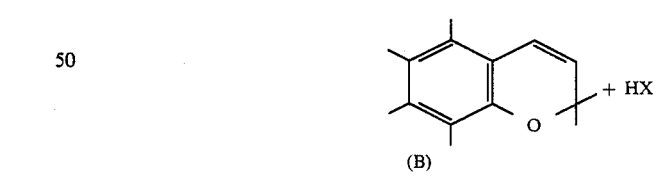
(B)

in which (A) can be any phenol and (B) a propargyl alcohol or propargyl alcohol derivative, such as a propargyl acetate. The reaction is catalysed by alumina and proceeds at relatively low temperatures with a marked absence of side reactions. In place of the acetate it is possible to use any aliphatic or aromatic carboxylate, e.g. the propionate or benzoate.

By capitalising on the variety of properties and absorption spectra of the above range of photochromic compounds, a unique design or mark can be produced which is virtually impossible to forge.

In some applications, the mark or design may be applied, e.g. from a photochromic ink, directly to the article or document. For example, the photochromic mark may be made by a printing technique such as screen printing, gravure or intaglio (but preferably screen printing), using an ink comprising a photochromic compound dissolved in a varnish or resin and thinned with an organic solvent.

Alternatively, the photochromic compound may be incorporated into an ink in the form of a photochromic pigment, obtained by incorporating a photochromic compound into a finely divided polymer powder. Suitable polymers include CR39 (polymerised diethyleneglycol bis allyl carbonate, of PPG Ltd. and pmma. The photochromic pigment is suspended in the ink varnish and the viscosity of the ink may be adjusted by adding solvent.

Screen printing is the preferred process for printing the mark or device onto the substrate, since this enables relatively thick dried ink films, e.g. from about 15 to 60 microns thick, normally 30 to 60 microns, to be readily obtained and high viscosity inks (with higher solids contents to be printed.

Conventional silk-screen ink formulations, e.g. cellulose derivatives, alkyd resins, polyvinyl, polyamide, epoxide and acrylic resins may be used. When printing onto a plastics substrate, it is desirable to incorporate a solvent in the ink which will 'attack' the plastics material to the extent that the ink will adequately adhere to the plastics surface. It is also advantageous to include a chlorinated rubber (e.g. 'Alloprene'—manufactured by I.C.I. plc) as the ink resin or a component thereof, since chlorinated rubber resins extend the working life of the photochromic polymers, presumably by reducing the permeability of the dried ink film to oxygen or moisture or by limiting the amount of shorter wavelength U.V. light in sunlight which penetrates the ink film.

Generally, the ink will have a solids content of about 40 to 70%, e.g. 60 to 70% and the photochromic compound will be present in the ink in a concentration of about 1 to 5%, preferably 1.5 to 3%.

The photochromic mark may be overprinted with one or more other inks (which may or may not be photochromic) to build up a more complex design. A protective layer which has a lower permeability to oxygen and water vapour is important to preserve the shelf life the mark.

The protective layer may be formed by screen-printing a clear layer over the dried photochromic ink layer. This protective layer should preferably be relatively thick e.g. more than about 50 microns and contain a resin which has reduced permeability to oxygen and moisture, e.g. a vinyl resin or a chlorinated rubber resin.

However, for applications where the product will be subjected to considerable use and handling, e.g. credit cards, it is preferred to laminate a clear plastics film over the dried ink film. Credit cards normally consist of a substrate of P.V.C. The substrate is printed or embossed with permanently visible data and screen-printed with the photochromic ink formulation to produce the security mark. A clear plastics film, e.g. of plasticised P.V.C. is then heat-laminated over the dried ink under heat and pressure. Normally a temperature of 100° to 200° C. for a few seconds duration is sufficient to effect the lamination. The substrate and protective layer are generally about the same thickness, e.g. about 0.25 to 0.5 mm.

Instead of printing the security mark or device directly onto the article, the photochromic ink may be printed onto a label which is then affixed, e.g. by adhesive to the article to be marked.

The following specific Examples will illustrate the invention:

Example 1

A solution of α-(2,5-dimethyl-3-furyl)ethylidene-(isopropylidine)succinic anhydride (structure X below) (0.2 g) in toluene was mixed with 'Uniplas' screen varnish (10 g). 'Uniplas' is a trade mark of Universal Colours Ltd. of Corby, Northants. The mixture was screen printed onto an aluminium adhesive backed label and the resultant label laminated with polyester. Irradiation of the label with ultra violet light ($\lambda = 366$ nm) caused a yellow to red colour change in the image.

Figure 2:
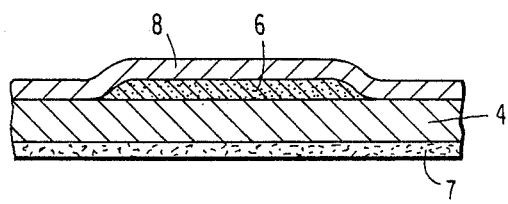

The construction of the label is shown in the accompanying diagrammatic drawings. In these drawings, FIG. 1 is a plan view of the label and FIG. 2 is a cross-section through the centre of the label. The label is generally indicated by the reference numeral 2 and comprises a base substrate 4 of aluminium or polyester film on the top surface of which is printed a photochromic mark 6, preferably by screen printing using a photochromic ink, and on the undersurface of which is provided an adhesive layer 7. The mark 6 consists of a background area having the word 'valid' overprinted in the photochromic ink. On irradiation with U.V. light the word 'valid' became visible within 10 to 15 seconds. On removal from the U.V. light, the word faded within about 30 seconds. The mark 6 is covered by a protective polymer film 8 to protect the compound from degradation by oxygen or water vapour and to give some protection against physical damage. The adhesive may be a pressure-sensitive adhesive or actuated by heat or solvent.

Example 2

A solution of 4-methyl-7,7-(2',2'-adamantyl)6,7-dihydrobenzo(b) thiophene-5,6-dicarboxylic anhydride (structure Y below) (0.2 g) in toluene was mixed with Uniplas screen varnish and the resultant mixture screen printed onto an adhesive backed polyester film. On exposure to sunlight the colourless image became blue. The image reverted to colourless when placed in the dark.

Example 3

A screen printing ink was formulated from Uniplas screen varnish (10 g) and a heliochromic pigment (2 g) obtained by the imbibition of CR39 powder with spiro-(2H-naphtho(1,2-b)pyran-2,2'-tricyclodecane (C) until the powder is saturated with the spiro-naphthopyran. The resultant ink was screen printed onto a P.V.C. substrate ½ mm thick. After drying the ink, the printed substrate was covered with a protective film of clear P.V.C. sheet and heat laminated together at a temperature of 150° C. for 10 seconds to produce a credit card device. The resultant image changed from colourless to yellow on exposure to sunlight and reverted to colourless when placed in the dark.

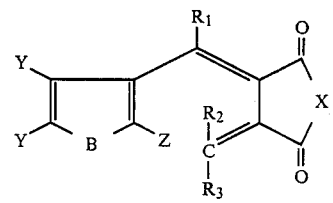
Structure X

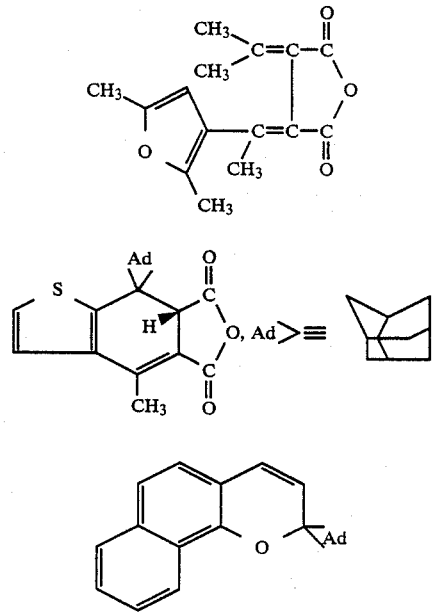
Structure Y

Structure Z

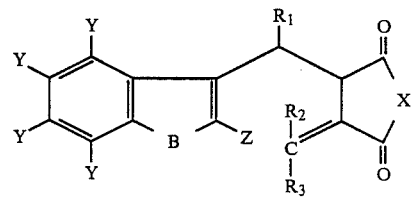

A specific example of a possible use of the photochromic labels described in the above Examples is as a product verification mark such as could be employed on a video cassette such that the mark is only exposed to the appropriate light when proof of authenticity is required.

The photochromic inks described herein would be suitable for use on labels containing a mixture of conventionally printed instructions describing the photochromic effect and a screen printed photochromic mark e.g. 'This product is authentic if the word "valid" appears in blue on exposure to sunlight'.

We claim:

1. A security device in the form of a label, document or card which incorporates a security mark or device which is partially or wholly invisible in light which does not contain a U.V. component, said device comprising:
   (a) a flexible substrate having printed thereon a mark or device in a clear, dried, reversibly photochromic ink film, said ink in its liquid state comprising a solution of from 1 to 5% of a photochromic compound in a solvent/resin medium and said photochromic compound being selected from fulgides, fulgimides, benzopyrans and naphthopyrans and said dried ink film being from 10 to 60 microns thick, and
   (b) a clear, superficial protective layer extending over said mark or device, which gives protection for the photochromic compound against degradation by atmospheric moisture and oxygen,
   whereby said photochromic compound is converted to a colored form on exposure to U.V. light within about 60 seconds and reverts to a pale or substantially colourless form within about 2 minutes in the absence of U.V. light.

2. A security device according to claim 1 wherein the photochromic compound has the general formula (1A) or (1B) set forth below:

(IA)

(IB)

in which X represents oxygen or $NR_6$ where $R_6$ represents hydrogen, alkyl having 1 to 20 carbon atoms, cycloalkyl having 5 to 12 carbon atoms, aralkyl having 7 to 9 carbon atoms, aryl having 6 to 14 carbon atoms, which may be substituted with one or more halogen or alkoxy groups having 1 to 20 carbon atoms, or alkaryl having 7 to 22 carbon atoms; B represents oxygen or sulphur; $R^1$ represents a hydrogen atom, an alkyl group having 1 to 20 carbon atoms or an aryl group having 6 to 14 carbon atoms; $R^2$ and $R^3$ are the same or different alkyl groups having 1 to 20 carbon atoms or one of $R^2$ and $R^3$ is hydrogen and the other is an alkyl group having 1 to 20 carbon atoms, or an aryl group having 6 to 14 carbon atoms which may be substituted with one or more halogen atoms and/or any combination of groups selected from the following: alkoxy groups having 1 to 20 carbon atoms, or alkaryl having 7 to 22 carbon atoms; or is a methylenedioxy group, Z represents hydrogen, an alkyl group having 1 to 20 carbon atoms, an aryl group having 6 to 14 carbon atoms or an aralkyl group having 7 to 20 carbon atoms; each Y is the same or different and represents a hydrogen or halogen atom, an alkyl or alkoxy group having 1 to 20 carbon atoms, or an aryl or aryloxy group having 6 to 14 carbon atoms.

3. A security device according to claim 1 wherein the photochromic compound has the following general formula:

(3)

represents an adamantylidene of a substituted adamantylidene group;

$R_1$ represents hydrogen, alkyl, aryl, aralkyl or a heterocyclic group;

X represents oxygen or $NR_2$, in which $R_2$ is hydrogen, aryl, alkyl or aralkyl, and

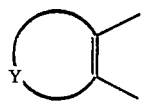 (II)

represents an aromatic group, an unsaturated heterocyclic group or a benzannelated heterocyclic group.

4. A security device according to claim 1 wherein the photochromic compound has the following general formula:

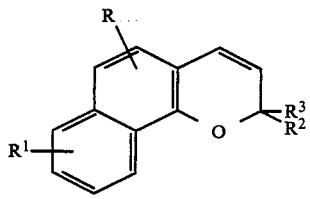 (5)

wherein R and $R^1$ may be independently selected from hydrogen, alkyl, alkoxy, chloro, alkyl or dialkyl amino or hydroxy, and $R^2$ and $R^3$ may together represent a spiro heterocyclic ring or an adamantylidene group.

5. A security device according to claim 4, wherein $R^2$ and $R^{23}$ are alkyl or aryl.

6. A security device according to claim 1, in which the protective film is a cleary polymer film which is applied over the dried ink film and is laminated to the substrate.

7. A method of marking an article or substrate with a security or identification mark or device which is made visible or its visibility is enhanced on exposure to U.V. light, said method comprising the steps of:

(a) printing onto the article or substrate a photochromic ink which comprises a solution in a clear ink, including a varnish or resin component and a solvent, of from 1 to 5% by weight of a photochromic compound selected from fulgides, fulgimides, benzopyrans and naphthopyrans, (b) drying the ink to form a clear, dried ink film which is reversibly converted to a colored form on exposure to U.V. light within about 60 seconds and reverts to a substantially colorless form within about 2 minutes in the presence of white light having substantially no U.V. component, and (c) applying over the resulting printed mark or device, a superficial, protective layer having reduced permeability to oxygen and water so as to protect the photochromic compound against degradation by atmospheric moisture and oxygen.

8. A method according to claim 7 wherein the photochromic ink is printed by silk-screen or intaglio printing onto the article or substrate and dried to form a film about 20 to 60 microns thick.

9. A method according to claim 8 wherein said protective layer is formed by printing a clear, colorless ink over the dried photochromic ink film.

10. A method according to claim 9 wherein said colorless ink comprises an oxygen/moisture impermeable resin selected from a vinyl resin and a chlorinated rubber resin.

11. A method according to claim 8 wherein a clear plasticised PVC film is heat-laminated over the dried photochromic ink film.

* * * * *